(12) United States Patent
Cian et al.

(10) Patent No.: US 11,758,099 B2
(45) Date of Patent: *Sep. 12, 2023

(54) IMAGE BLENDING METHOD, PROJECTION SYSTEM AND PROCESSING DEVICE THEREOF

(71) Applicant: Coretronic Corporation, Hsin-Chu (TW)

(72) Inventors: Jyun-Lin Cian, Hsin-Chu (TW);
Chi-Wei Lin, Hsin-Chu (TW);
Yung-Chiao Liu, Hsin-Chu (TW);
Chien-Chun Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 169 days.

This patent is subject to a terminal disclaimer.

(21) Appl. No.: 17/361,355

(22) Filed: Jun. 29, 2021

(65) Prior Publication Data

US 2021/0329202 A1   Oct. 21, 2021

Related U.S. Application Data

(62) Division of application No. 16/663,348, filed on Oct. 25, 2019, now Pat. No. 11,082,672.

(30) Foreign Application Priority Data

Oct. 31, 2018   (CN) .......................... 201811283707.2

(51) Int. Cl.
*H04N 9/31*   (2006.01)
*G06T 7/33*   (2017.01)
*G06T 7/73*   (2017.01)

(52) U.S. Cl.
CPC ............. *H04N 9/3182* (2013.01); *G06T 7/33* (2017.01); *G06T 7/73* (2017.01); *H04N 9/3147* (2013.01);

(Continued)

(58) Field of Classification Search
CPC .. H04N 9/3182; H04N 9/3147; H04N 9/3185; G06T 7/73; G06T 7/33;

(Continued)

(56) References Cited

U.S. PATENT DOCUMENTS 11,082,672 B2   8/2021 Cian et al.
2011/0234920 A1*  9/2011 Nelson ................. H04N 9/3194
348/E3.048

(Continued)

FOREIGN PATENT DOCUMENTS

CN   101017316   8/2007
CN   101116049   1/2008
EP   0556304   8/1993

OTHER PUBLICATIONS

"Office Action of U.S. Appl. No. 16/663,357", dated Feb. 2, 2022, p. 1-p. 38.

(Continued)

*Primary Examiner* — John W Miller
*Assistant Examiner* — Omer Khalid
(74) *Attorney, Agent, or Firm* — JCIPRNET

(57) ABSTRACT

The disclosure provides an image blending method. The method includes projecting a plurality of images onto a projection surface, respectively, wherein an image of the first portion of the first image and an image of the first portion of the second image projected onto the projection surface overlap each other in the first overlapping area on the projection surface; the image parameters of all pixels of the first non-overlapping area and the second non-overlapping area are adjusted according to the position of the first non-overlapping area and the position of the second non-overlapping area, such that the black-level brightness of the first non-overlapping image in the first non-overlapping area of the first image and the black-level brightness of the second non-overlapping image in the second non-overlap- (Continued)

ping area of the second image are close to the black-level brightness of the first overlapping image in the first overlapping area.

8 Claims, 14 Drawing Sheets

(52) U.S. Cl.
CPC . *H04N 9/3185* (2013.01); *G06T 2207/10024* (2013.01); *G06T 2207/20132* (2013.01); *G06T 2207/20221* (2013.01)

(58) Field of Classification Search
CPC . G06T 2207/10024; G06T 2207/20221; G06T 2207/20132
USPC .......................................................... 348/745
See application file for complete search history.

(56) References Cited

U.S. PATENT DOCUMENTS

| 2013/0321782 | A1 | 12/2013 | Ishii |
| 2014/0104581 | A1 | 4/2014 | Yoshimura |
| 2018/0139422 | A1* | 5/2018 | Moule ........................ G06T 7/13 |
| 2020/0134798 | A1 | 4/2020 | Cian et al. |
| 2021/0329202 | A1 | 10/2021 | Cian et al. |

OTHER PUBLICATIONS

"Office Action of China Related Application No. 201811286626.8", dated Apr. 30, 2021, pp. 1-13.

* cited by examiner

IMAGE BLENDING METHOD, PROJECTION SYSTEM AND PROCESSING DEVICE THEREOF

CROSS-REFERENCE TO RELATED APPLICATION

This application is a divisional application of U.S. application Ser. No. 16/663,348, filed on Oct. 25, 2019, now allowed, which claims the priority benefit of China application serial no. 201811283707.2, filed on Oct. 31, 2018. The entirety of each of the above-mentioned patent applications is hereby incorporated by reference herein and made a part of this specification.

BACKGROUND OF THE DISCLOSURE

Field of the Disclosure

The present disclosure relates to a projection method, and in particular to an image blending method, a projection system and a processing device thereof.

Description of Related Art

At present, when a projector performs blending images, the multiple images projected by multiple projectors are blended together, the black-level brightness of the image at the overlapping part is much higher than the black-level brightness of the image at the non-overlapping part.

However, the typically known dark field compensation method adjusts each of rectangular ranges by controlling each projector to output one or more fixed rectangular ranges, such that all rectangular ranges can cover the non-overlapping part of the image projected by the corresponding projector.

FIG. 1 is a schematic diagram illustrating a known image blending operation. Referring to FIG. 1, for example, it is assumed that the projector 10 and the projector 20 are respectively configured to project the first image IMG01 and the second image IMG02 as a full black image. It should be noted that the black-level brightness of the image OIMG at the overlapping part between the first image IMG01 and the second image IMG02 is brighter. Typically, a rectangular area RA1 is set in the first image IMG01 by the projector 10 to cover the image IMG01(1) in the non-overlapping area above the overlapping image OIMG in the first image IMG01, and another rectangular area RA2 is set to cover the image IMG01(2) in the non-overlapping area on the left side of the overlapping image OIMG in the first image IMG01. Next, the projector 10 increases the grayscale values of all the pixels of images IMG01(1) and IMG01(2) in the non-overlapping area, so that the black-level brightness of the images IMG01(1) and IMG01(2) in the non-overlapping area is similar to or equal to the black-level brightness of the overlapping image OIMG in the overlapping area. Similarly, the conventional method also uses another projector 20 to set a rectangular area RA3 in the second image IMG02 to cover the image IMG02(1) in the non-overlapping area under the overlapping image OIMG in the second image IMG02, and set another rectangular area RA4 to cover the image IMG02(2) in the non-overlapping area on the right side of the overlapping image OIMG in the second image IMG02. Next, the projector 10 increase the grayscale values of all the pixels of the images IMG01(1) and IMG01(2) in the non-overlapping area, such that the black-level brightness of the images IMG01(1) and IMG01(2) in the non-overlapping area is similar to or equivalent to the black-level brightness of the image OIMG in the overlapping area.

However, the above blackening method requires four rectangles to cover the images in all of the non-overlapping areas, and the black-level brightness of the projected non-overlapping areas need to be set separately. Therefore, the conventional method performs the setting of the rectangular area four times to set four rectangles, or performs the setting of black-level brightness in the projectors separately to set the projectors, which leads to excessive adjustment operations and reduces the efficiency of the image blending operation. Therefore, it has drawn the attention of practitioners of the field to find out how to improve the efficiency of image blending operation for multiple images projected by multiple projectors.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE DISCLOSURE

The disclosure provides an image blending method, a projection system and a processing device thereof for controlling a plurality of control patterns to match overlapping areas in a plurality of images projected by a plurality of projectors by setting a common overlapping area, thereby adjusting the image parameters of the image in the non-overlapping area and obtaining a simple adjusting method and a better image blending effect.

An embodiment of the disclosure provides an image blending method, which is adapted for multiple images projected by a plurality of projectors. The method includes projecting a first image and a second image onto a projection surface by a first projector and a second projector respectively, and wherein an image of a first portion of the first image and an image of a first portion of the second image projected on the projection surface overlap each other in a first overlapping area on the projection surface. The method includes rendering a first control pattern through a processing device, and projecting the first control pattern transmitted through the first projector onto the first image, wherein the first control pattern is projected onto a first initial position in the first image, and the first initial position of the first control pattern does not match the first overlapping area. After projecting the first control pattern, the processing device adjusts the first control pattern in the first image and moves the first control pattern from the first initial position to the first overlapping area according to a first input operation applied to the processing device such that a first control pattern frame of the first control pattern matches a boundary of the first overlapping area.

The method further comprises identifying, by the processing device, a position of a first non-overlapping area in the first image according to a position of the matched first control pattern frame, and rendering a second control pattern through the processing device, and projecting the second control pattern through the second projector onto the second image.

The method further comprises adjusting the second control pattern in the second image through the processing device according to a second input operation applied to the processing device such that a second control pattern frame of the second control pattern matches the boundary of the first overlapping area. The method further comprises identifying, by the processing device, a position of the second non-overlapping area in the second image according to a position of the matched second control pattern frame, and adjusting, by the processing device, image parameters of all pixels of the first non-overlapping area and the second non-overlapping area according to a position of the first non-overlapping area and a position of the second non-overlapping area, such that a black-level brightness of a first non-overlapping image in the first non-overlapping area of the first image and a black-level brightness of a second non-overlapping image in the second non-overlapping area of the second image are close to a black-level brightness of a first overlapping image in the first overlapping area.

An embodiment of the disclosure provides a projection system. The projection system comprising a first projector, a second projector, and a processing device, wherein the processing device is connected to the first projector and the second projector, wherein the processing device is configured to, according to a projection instruction of the processing device, transmit an image data corresponding to the projection instruction to the first projector and the second projector. Wherein the first projector projects a first image onto a projection surface according to a first image data, and the second projector projects a second image onto the projection surface according to a second image data, wherein an image of a first portion of the first image and an image of a first portion of the second image projected on the projection surface overlap each other in a first overlapping area on the projection surface. Wherein the processing device renders a first control pattern, and projects the first control pattern onto the first image through the first projector, wherein the first control pattern is projected onto a first initial position in the first image, and the first initial position of the first control pattern does not match the first overlapping area. After projecting the first control pattern, the processing device is further configured to adjust the first control pattern in the first image and move the first control pattern from the first initial position to the first overlapping area according to a first input operation applied to the processing device, such that a first control pattern frame of the first control pattern matches a boundary of the first overlapping area. The processing device is further configured to identify a position of a first non-overlapping area in the first image according to a position of the matched first control pattern frame. The processing device renders a second control pattern, and projects the second control pattern onto the second image through the second projector. The processing device is further configured to adjust the second control pattern in the second image according to a second input operation applied to the processing device, such that a second control pattern frame of the second control pattern matches the boundary of the first overlapping area. The processing device is further configured to identify a position of a second non-overlapping area in the second image according to a position of the matched second control pattern frame. The processing device is further configured to adjust image parameters of all pixels of the first non-overlapping area and the second non-overlapping area according to a position of a first non-overlapping area and a position of a second non-overlapping area, such that a black-level brightness of a first non-overlapping image in the first non-overlapping area of the first image and a black-level brightness of a second non-overlapping image in the second non-overlapping area of the second image are close to a black-level brightness of a first overlapping image in the first overlapping area.

Based on the above, the image blending method, the projection system and the processing device thereof provided by the embodiments of the present disclosure may project multiple control patterns, and adjust multiple control patterns through the processing device to be matched to the overlapping areas between multiple images projected by multiple projectors to identify a plurality of non-overlapping areas of the plurality of images, thus adjusting the image parameters of the images in the plurality of non-overlapping areas, such that the black-level brightness of all of the plurality of projected images are uniform or similar to each other. In this manner, not only that the multiple steps of the blackening process in the image blending operation can be simplified, but also the non-overlapping areas with irregular shapes can be efficiently identified, and the time consumed for the image blending operation for multiple projection images can be reduced, which in turn increases the overall operation efficiency of the projection system.

In order to make the aforementioned features and advantages of the disclosure more comprehensible, embodiments accompanying figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The above and other technical contents, features and effects of the present disclosure will be clear from the below detailed description of an embodiment of the present disclosure with reference to accompanying drawings. The directional terms mentioned in the embodiments below, like "above", "below", "left", "right", "front", and "back" refer to the directions in the appended drawings. Therefore, the directional terms are only used for illustration instead of limiting the present disclosure.

Figure 1:
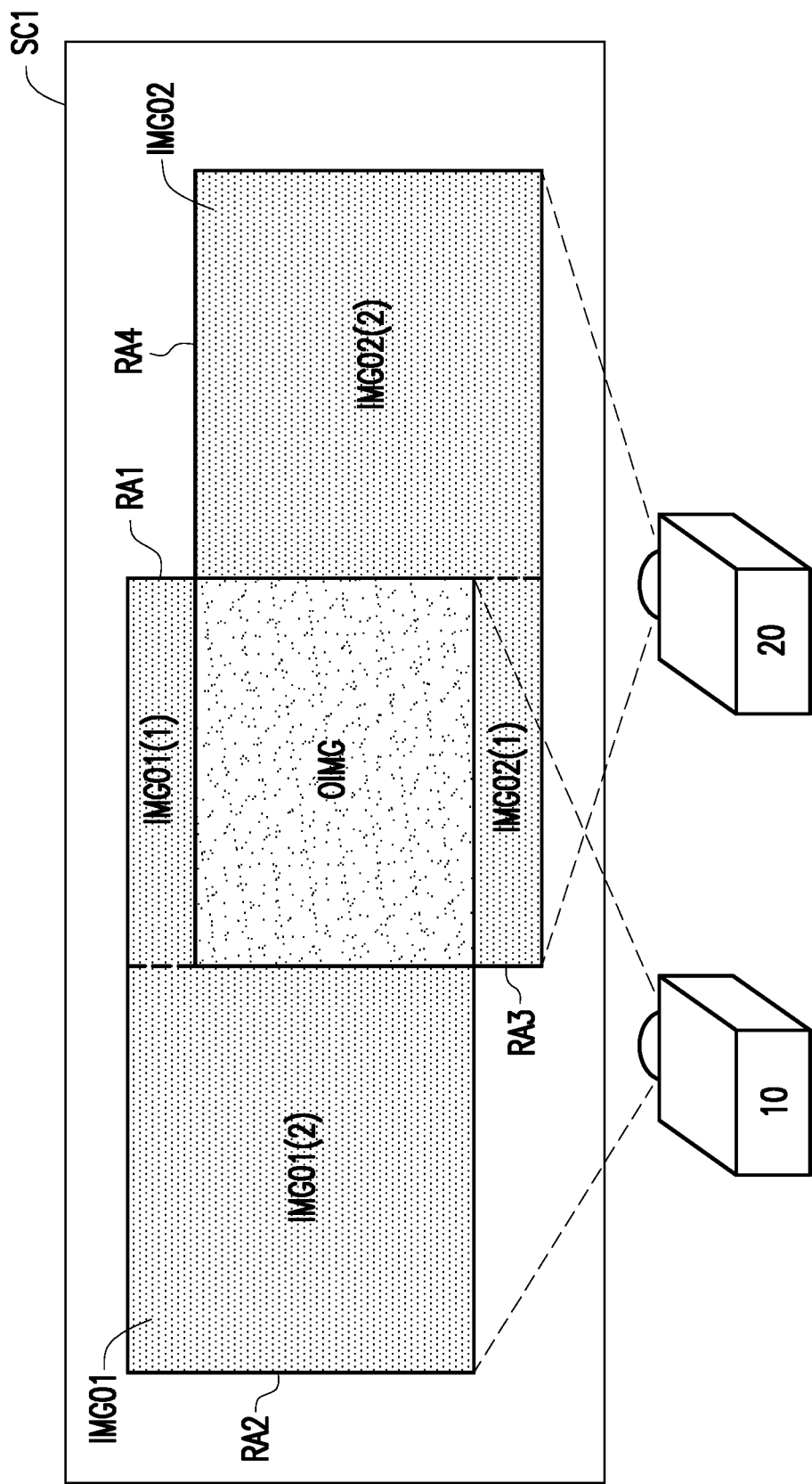
FIG. 1 is a schematic diagram illustrating a known image blending operation.
Figure 2A:
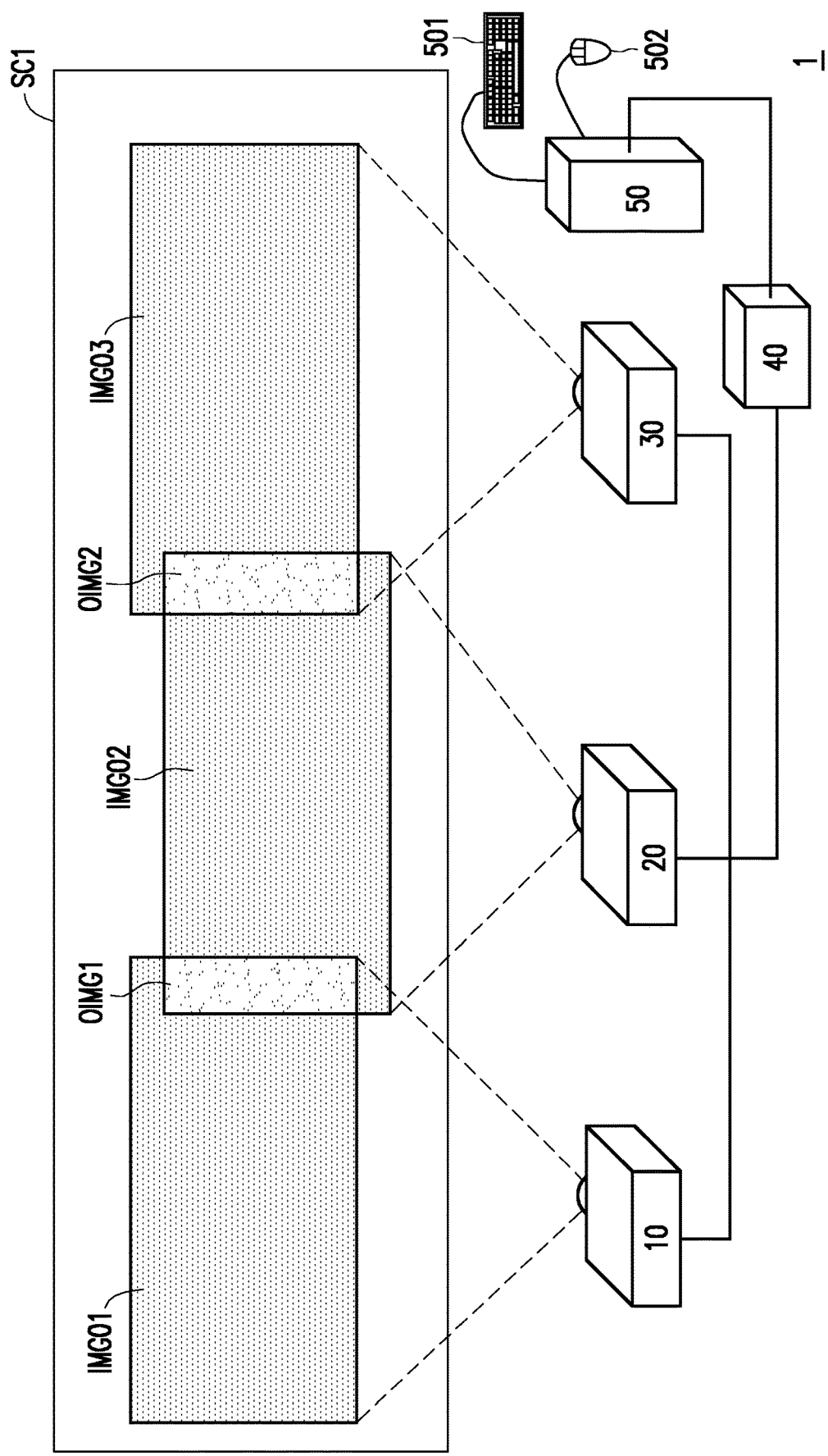
FIG. 2A is a schematic view of a projection system according to an embodiment of the disclosure.

FIG. 2A is a schematic view of a projection system according to an embodiment of the disclosure. Referring to FIG. 2A, the projection system 1 includes a plurality of projectors. In this embodiment, the projection system 1 includes three projectors (e.g., projector 10, projector 20, and projector 30), an image cropping device 40 and a processing device 50. The user may perform an input operation by an input device (e.g., keyboard 501 and mouse 502) of the processing device 50 to trigger the processing device 50 to perform an image blending operation (or a blackening operation).

The image cropping device 40 is coupled to the processing device 50. The image cropping device 40 receives the projection instruction and the image data (the data of the image to be projected) provided by the processing device 50, and the image cropping device 40 is configured to respectively transmit the image data corresponding to the projection instruction to the first projector 10, the second projector 20 and the third projector 30 according to the projection instruction provided by the processing device 50. The projection instructions include one or more image cropping instructions. The processing device 50 may transmit a projection instruction to the image cropping device 40, and the image cropping device 40 may capture multiple portions of the image data to become a plurality of sub-image data corresponding to a plurality of sub-images by using a plurality of image cropping instructions in the projection instruction, and the image cropping device 40 transmits the plurality of sub-image data to the plurality of projectors respectively for projection, wherein each projector projects a corresponding image according to the received sub-image data (e.g., first projector 10 projects first image IMG01; second projector 20 projects second image IMG02; third projector 30 projects third image IMG03). It should be noted that two sub-images in multiple sub-images corresponding to two adjacent projectors may have partially identical images/pictures or all have the same image/picture.

Since the hardware configuration of the projectors 20 and 30 may be the same as that of the projector 10, the hardware components of the projector 10 are described below with reference to FIG. 2B only.

Figure 2B:
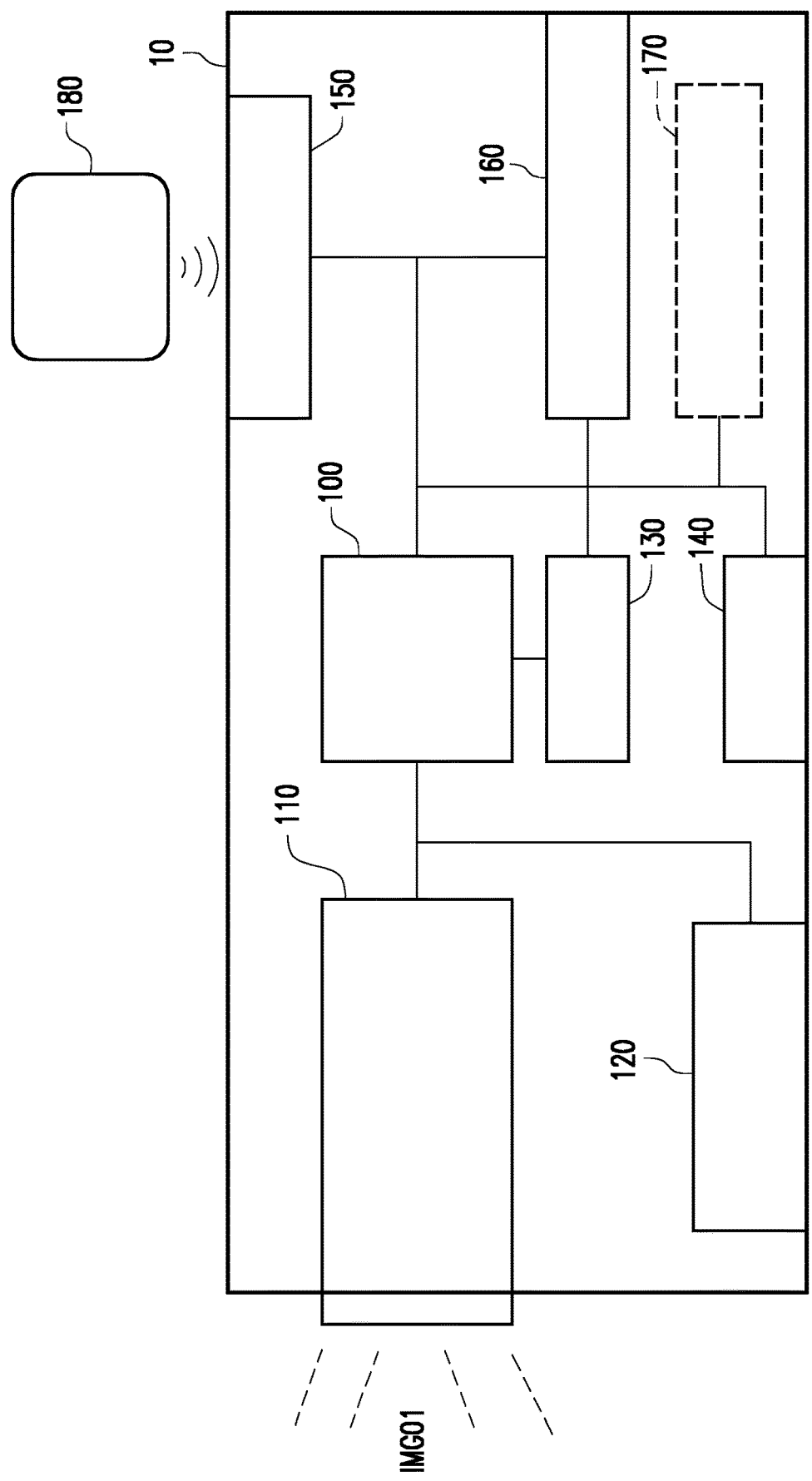
FIG. 2B is a block diagram illustrating a projector according to an embodiment of the disclosure.

FIG. 2B is a block diagram illustrating a projector according to an embodiment of the disclosure. Referring to 2A and 2B, the projector 10 (also referred to as a first projector) includes a processor 100 (also referred to as a first processor), a projection module 110 (also referred to as a first projection module), and a power management circuit unit 120 (also referred to as a first power management circuit unit), a storage device 130 (also referred to as a first storage device), a display 140 (also referred to as a first display), an input interface 150 (also referred to as a first input interface), and a connection interface 160 (also referred to as the first connection interface). The processor 100 is coupled to the projection module 110, the power management circuit unit 120, the storage device 130, the display 140, the input interface 150, and the connection interface 160.

In another embodiment, the projector 10 further includes a communication circuit unit 170 (also referred to as a first communication circuit unit) coupled to the processor 100, and the communication circuit unit 170 is connected to other projectors or internet to access data or instructions in a wired or wireless manner.

In the present embodiment, the processor 100 is hardware having computing capabilities or includes an execution program for managing the overall operation of the projector 10. In this embodiment, the processor 100 is, for example, a one-core or multi-core central processing unit (CPU), a programmable micro-processor, a digital signal processor (DSP), a programmable controller, an application specific integrated circuit (ASIC), a programmable logic device (PLD), or the like.

The projection module 110 is configured to receive image data from the processor 100, for example, the first image data provided from an external data terminal (such as processing device 50) to the processor 100 of the projector 10 or the first image data stored in the storage device 130, and transmit the same to the projection module 110. Additionally, regarding the image data of the control pattern provided by the processor 100, the image data of the control pattern may be from the storage device 130 or an external data terminal, and the image beam is projected according to the image data to form a first image corresponding to the image data projected on a projection surface (such as a screen or wall). The projection module 110 includes a light source module and an optical engine. The optical engine includes a light valve and a projection lens. The light source module is used to provide an illumination beam. The light valve is, for example, a reflective or transmissive spatial light modulator, such as a digital micro-mirror device (DMD) or reflective liquid crystal on silicon (LCOS), and the like in the case of reflective spatial light modulator, or such as a transparent liquid crystal panel in the case of transmissive spatial light modulator. In addition, depending on the method of inputting control signal, the spatial light modulator is, for example, an optically addressed spatial light modulator (OASLM) or an electrically addressed spatial light modulator (EASLM), the present disclosure provides no limitation to the form and type of the light valve.

In addition, the light valve is disposed on the transmission path of the illumination beam and is used to convert the illumination beam into an image beam. The projection lens is disposed on the transmission path of the image beam and is used to project the image beam out of the projection module 110.

The power management circuit unit 120 is for managing power of the projector 10, and the power management circuit unit 120 is also for receiving power (for example, city power, or other forms of external power) from the outside. The power management circuit unit 120 may also be provided with an independent internal power source, such as a battery.

The storage device 130 is configured to temporarily store data through an instruction of the processor 100, and the data includes data for managing the projector 10, the data received from the external processing device 50 or other type of data, the present disclosure is not limited thereto. The above-mentioned data includes, for example, control parameters of various components of the projector or image signals. In addition, the storage device 130 may also record some data that needs to be stored for a long time by the instruction of the processor 100, for example, related information or recorded data corresponding to image blending, and firmware or software for managing the projector 10. It is worth mentioning that the storage device 130 may be any form of non-volatile memory storage device or volatile memory storage device. For example, the storage device 130 is, for example, a movable random access memory (RAM), a read-only memory (ROM), a flash memory, or the like, or a combination of the above components.

The display 140 is used to display an image or text content of a corresponding operational function of the projector. For example, the display 140 may be a liquid crystal display (LCD), a light-emitting diode (LED) display, or a field emission display (FED). The display 140 is disposed on the housing of the projector 10.

The input interface 150 is configured to receive an input operation applied by the user to the input interface to generate a corresponding control signal. The processor 100 may perform a corresponding function or operation according to the input signal. The input interface 150 may include a plurality of buttons (keys), switches, or knobs corresponding to different functions and is disposed on the housing of the projector 10. The input interface 150 may also be connected to other external input devices (e.g., keyboard, mouse, etc.). In another embodiment, the input interface 150 also has an infrared receiver to receive infrared (also referred to as remote input operation) from the remote control 180, thereby generating corresponding control signals to the processor 100 to perform the corresponding functions. It should be noted that the present disclosure is not limited to the specific forms of the various input operations disclosed in the following embodiments. The plurality of input operations may be implemented by pressing a button, using a touch screen, clicking a mouse, using a keyboard, or the like, or a combination thereof.

In an embodiment, the display 140 may also be integrated with the input interface 150 as a touch screen composed of, for example, a resistive, capacitive or optical touch panel to provide display and touch input functions simultaneously.

Referring to FIG. 2A and FIG. 2B, the connection interface 160 is used to be connected to a data terminal (processing device 50) to receive image data from the data terminal. The data terminal is, for example, any electronic device capable of outputting image data. The processing device 50 is, for example, a personal computer, a notebook computer, a server host external storage device, a smart phone, a tablet PC, and the like. The connection interface 160 is a circuit interface that includes a plurality of input interfaces. The input interface is, for example, an input interface conforming to a Video Graphics Array (VGA) standard, a Digital Visual Interface (DVI) standard, a High Definition Multimedia Interface (HDMI) standard, or other suitable standards (for example, DisplayPort standard, 3G-SDI, HDBaseT). However, the disclosure is not limited thereto. For example, in another embodiment, the connection interface 160 may also include being compatible with Serial Advanced Technology Attachment (SATA) standard. However, it should be indicated that the present disclosure is not limited thereto, and the connection interface 160 may also be an interface circuit unit conforming to Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) standard or other suitable standards. The projector 10 may establish connection with the image cropping device 40 through the connection interface 160.

The communication circuit unit 170 may have a wireless communication module (not shown) and support one of Wireless Fidelity (WiFi) system and Bluetooth communication technology or a combination thereof, and is not limited thereto. In addition, the communication circuit unit 170 may further include a network interface card (NIC) connected to the network through the connected network cable. In other words, the communication circuit unit 170 may be connected to the local area network or the Internet in a wired or wireless manner to access data or instructions. The projector 10 may establish connection with the image cropping device 40 through the communication circuit unit 170.

It should be noted that the descriptions regarding the function of the various components of the projector 10 are merely illustrative and are not intended to limit the present disclosure. Further, as described above, the projectors 20 and 30 have the same structure as the projector 10. For example, the projector 20 (also referred to as a second projector) includes a second processor, a second projection module, a second power management circuit unit, a second storage device, a second display, a second input interface, and a second connection interface. The projector 30 (also referred to as third projector) includes a third processor, a third projection module, a third power management circuit unit, a third storage device, a third display, a third input interface, and a third connection interface. Additionally, in another embodiment, the projectors 20 and 30 further include a second communication circuit unit and a third communication circuit unit coupled to the second processor and the third processor. The details of the hardware of the second projector 20 and the third projector 30 are omitted.

In this embodiment, referring to FIG. 2A, the image cropping device 40 is, for example, a device that inputs image data and has a cropping image function through a projection instruction. The image cropping device is, for example, a graphics card or an Optoma GB-200 image blending device, and the present disclosure is not limited to the above device. In addition, the image cropping device 40 is also used to perform image processing operation for image blending.

Figure 2C:
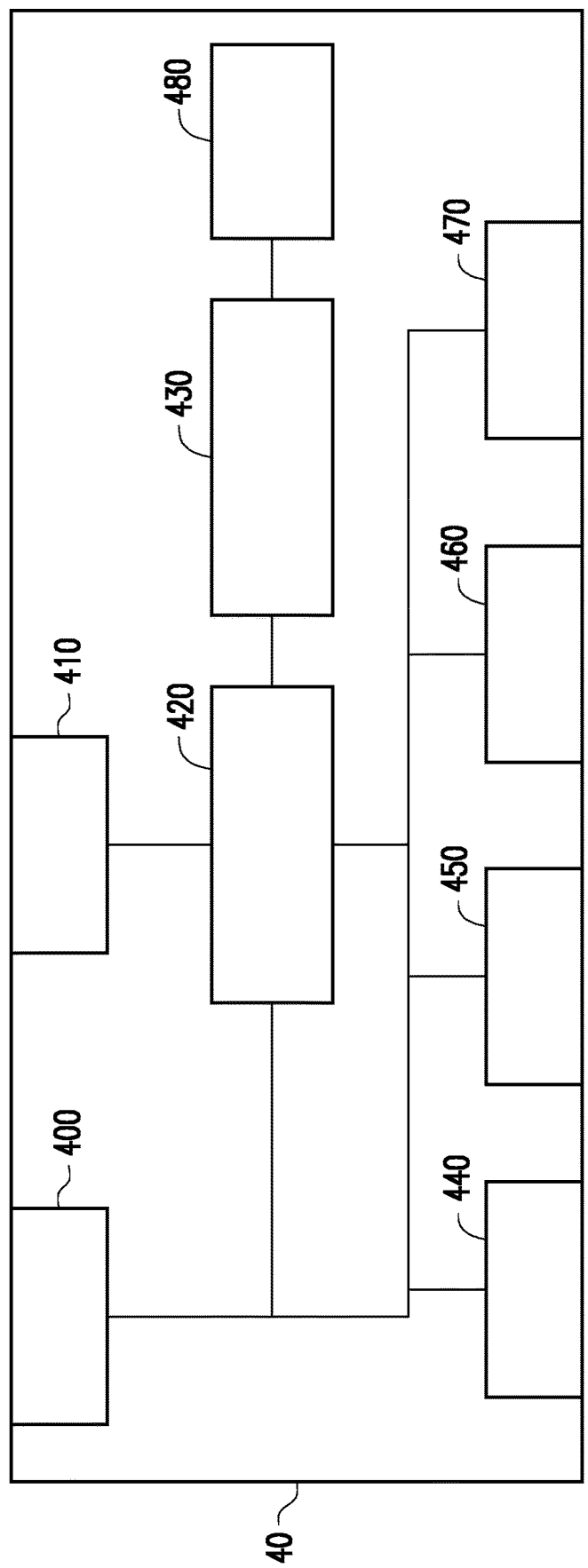
FIG. 2C is a block diagram illustrating an image cropping device according to an embodiment of the disclosure.

FIG. 2C is a block diagram illustrating an image cropping device according to an embodiment of the disclosure. Referring to FIG. 2C, the image cropping device 40 includes a power management unit 400, a connection interface 410, an image cropping processor 420, an image segmentation management module 430, a first output interface 440, a second output interface 450, a third output interface 460, a fourth output interface 470, a connection interface 480 and a storage device 480. The image cropping processor 420 is coupled to the connection interface 410, the power management unit 400, the image segmentation management module 430, the first output interface 440, the second output interface 450, the third output interface 460, the fourth output interface 470, and the storage device 480.

The image cropping processor 420 is hardware capable of processing images for processing image data inputted by the processing device 50. In this embodiment, the image cropping processor 420 is, for example, a one-core or multi-core central processing unit (CPU), a graphics processing unit (GPU), a programmable micro-processor, a digital signal processor (DSP), a programmable controller, an application specific integrated circuits (ASIC), a programmable logic device (PLD) or other similar devices. In addition, the image segmentation management module 430 controls the cropping settings of the pattern to perform corresponding operations (e.g., image segmentation operations, etc.) to implement the image blending method (or blackening method) provided by the embodiments of the present disclosure.

The connection interface 410 is connected to the processing device 50, and the connection interface 410 receives the image data and projection instructions transmitted from the processing device 50. The connection interface 410 is a circuit interface of the input interface. The input interface is, for example, an input interface conforming to Video Graphics Array (VGA) standard, Digital Visual Interface (DVI) standard, High Definition Multimedia Interface (HDMI) standard, or other suitable standards (for example, DisplayPort standard, 3G-SDI, HDBaseT). The first output interface 440, the second output interface 450, the third output interface 460, and the fourth output interface 470 are, for example, circuit interfaces of multiple output interfaces. The output interface is, for example, an output interface conforming to Video Graphics Array (VGA) standard, Digital Visual Interface (DVI) standard, High Definition Multimedia Interface (HDMI) standard, or other suitable standards (for example, DisplayPort standard, 3G-SDI, HDBaseT). The present disclosure provides no limitation to the specifications of the above input or output interface. In addition, the storage device 480 is, for example, a movable random access memory (RAM), a read-only memory (ROM), a flash memory, or the like, or a combination of the above elements.

In this embodiment, the processing device 50 is, for example, any electronic device (also referred to as a data terminal) that can output image data, such as a personal computer, a notebook computer, a server host external storage device, a smart phone, a tablet PC, and so on. In addition, the processing device 50 is further configured to perform an image blending operation and an image blending method (or a blackening method). The so-called blackening is to make the user to visually perceive that the grayscale value of the blended image picture approximately appears in a consistent manner when the blended image picture is shown as black picture.

Figure 3:
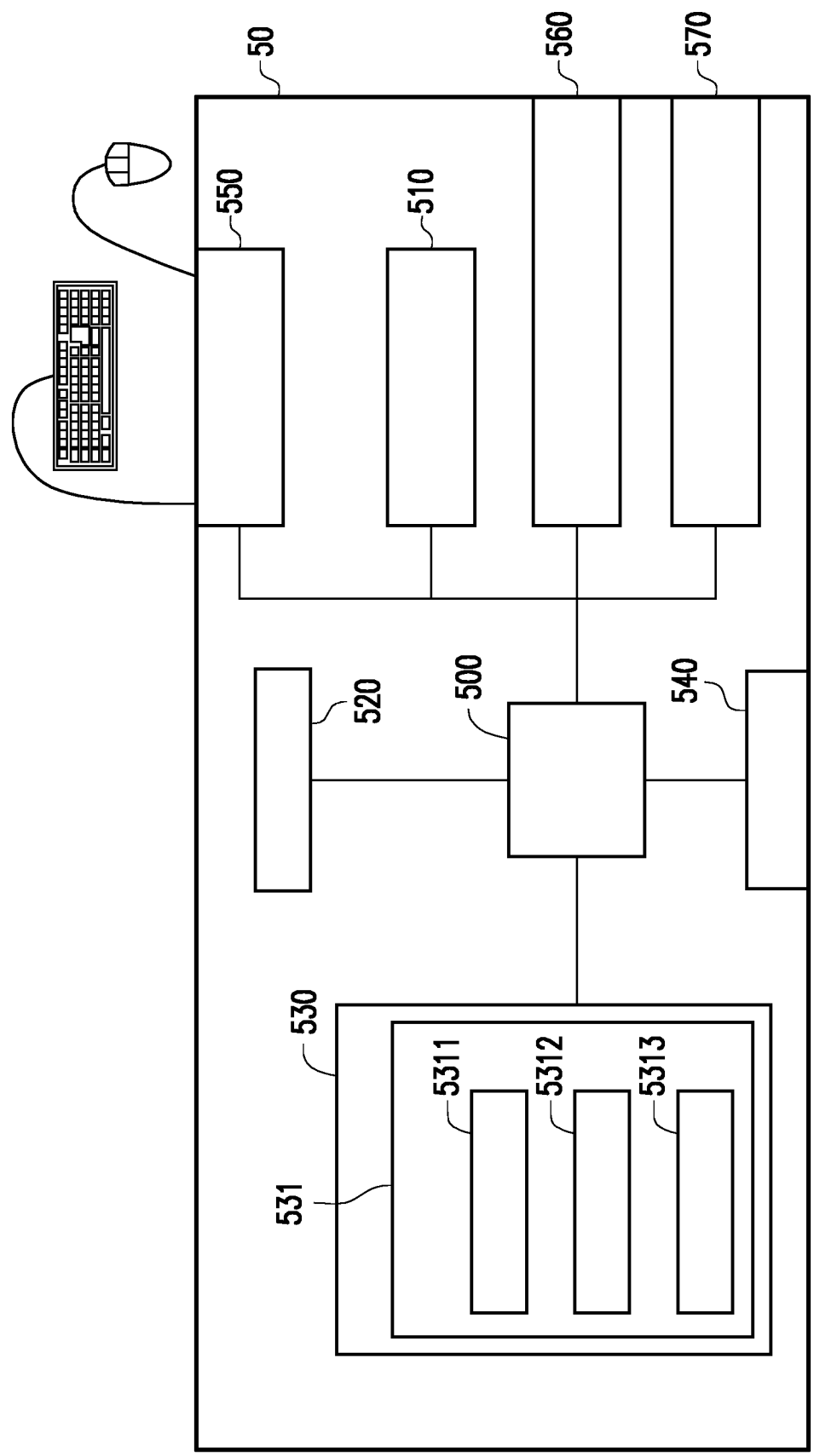
FIG. 3 is a block diagram illustrating a processing device according to an embodiment of the disclosure.

FIG. 3 is a block diagram illustrating a processing device according to an embodiment of the disclosure. Referring to FIG. 3, the processing device 50 includes a main processor 500, a main memory 510, a power management circuit unit 520, a storage device 530, a display 540, an input interface 550, a connection interface 560, and a communication circuit unit 570. The main processor 500 is coupled to the main memory 510, the power management circuit unit 520, the storage device 530, the display 540, the input interface 550, the connection interface 560, and the communication circuit unit 570.

The functions of the power management circuit unit 520, the display 540, the input interface 550, the connection interface 560, and the communication circuit unit 570 are similar to the power management circuit unit 120, the display 140, the input interface 150, the connection interface 160, and the communication circuit unit 170, and thus related descriptions are omitted herein.

The storage device 130 is configured to record some data that needs to be stored for a long time, for example, related information or recorded data corresponding to image blending, multiple image data, and firmware or software for managing the projector 10. It should be noted that the storage device 130 may be a non-volatile memory storage device of any form (e.g., a hard disk drive or a solid state drive). In this embodiment, the storage device 530 is further configured to store a plurality of program codes/application programs, and the main processor 500 may access the program code/application program to perform various operations. The plurality of program codes includes an image blending management module 531 (also referred to as an image blending application program). The image blending management module 531 includes an image segmentation management module 5311, a control pattern setting module 5312, and a blackening management module 5313.

The main processor 500 is hardware having computing capabilities for managing the overall operation of the processing device 50. In this embodiment, the main processor 500 is, for example, a one-core or multi-core central processing unit (CPU), a programmable micro-processor, a digital signal processor (DSP), a programmable controller, an application specific integrated circuit (ASIC), a programmable logic device (PLD), or the like. The main processor 500 may access and execute the image blending management module 531, the image segmentation management module 5311, the control pattern setting module 5312, and the blackening management module 5313 to perform corresponding operations (e.g., image segmentation management operations, image blending operation, blackening program, etc.) to implement the image blending method (or blackening method) provided by the embodiments of the present disclosure. The image segmentation management module 5311 is configured to manage the image data transmitted to the image cropping device 40; the control pattern setting module 5312 is configured to set and render a control pattern to the selected projector, and identify overlapping area and non-overlapping area; the blackening management module 5313 is configured to adjust the image parameters of image data transmitted to the selected projector.

The main memory 510 is configured to temporarily store data or various instructions for controlling the processing device 50 through an instruction from the main processor 500. The data includes data for managing the processing device 50, configured to transmit image data or projection instructions to the image cropping device 40, and the present disclosure is not limited thereto. It should be noted that the main processor 500 may load the image blending management module 531 from the storage device 530 into the main memory 510 to execute the image blending management module 531 by the main memory 510.

It should be indicated that the input interface 550 may be coupled to the keyboard 501 and the mouse 502, so that the user can perform an input operation through the keyboard 501 and the mouse 502, and the main processor 500 may send the corresponding instruction or execute the corresponding program code according to the input operation (e.g., receiving the input signal corresponding to the input operation). In addition, if the processing device 50 is a tablet PC, or a similar electronic device such as a smart phone, the display 540 may be integrated with the input interface 550 as a touch screen; if the processing device 50 is a notebook computer, the input interface 550 may have a keyboard and a touch pad.

It should be noted that, in an embodiment, the image cropping device 40 may be integrated with the processing device 50. For example, the processing device 50 may have a graphics card including an image cropping device 40 and a graphics processing unit (GPU). The graphics processing unit is also known as a graphics core, a visual processor, a display chip, or a graphics chip, which is a microprocessor that specifically performs graphics calculating operation on personal computers, workstations, game consoles, and some mobile devices (such as tablet PC, smart phones, etc.). The graphics card may be coupled to the main processor 500 through the connection interface 560.

The image blending method provided by the present disclosure and the projection system 1 and the processing device 50 (and the function of the image blending management module 531) using the method are described in detail below with reference to a plurality of drawings.

Referring to FIG. 2A, for example, it is assumed that the projection system 1 includes a first projector 10, a second projector 20, and a third projector 30. The first projector 10, the second projector 20, and the third projector 30 are all connected to the image cropping device 40, and the image cropping device 40 is connected to the processing device 50, and the user currently wants to perform image blending operation (or blackening program).

In response to an input operation that triggers an image blending operation (or blackening program) (e.g., a user clicks a button indicating that the image blending operation is initiated using the mouse 503), the main processor 500 of the processing device 50 may be responsive to the signal generated by the input operation and start to perform the image blending operation (through executing the image blending management module 531).

Then, the main processor 500 (e.g., by executing the image segmentation management module 5311) transmits the first projection instruction, the second projection instruction, and the third projection instruction to the image cropping device 40, wherein the image cropping device transmits the first image data to the first projector 10 according to the first projection instruction, transmits the second image data to the second projector 20 according to the second projection instruction, and transmits the third image data to the third projector 30 according to the third projection instruction. The first projector 10 projects the first image IMG01 onto the projection surface SC1 according to the first image data, the second projector 20 projects the second image IMG02 onto the projection surface SC1 according to the second image data, and the third projector 30 projects the third image IMG03 onto the projection surface SC1 according to the third image data. In this embodiment, the first image IMG01, the second image IMG02, and the third image IMG03 are independent main images, and the main image is a preset image used for the blackening program. More specifically, the first image data is used to indicate that the first image is a pure black image (a pure black full screen picture, a black picture); the second image data is used to indicate that the second image is a pure black image; and the third image data is used to indicate that the third image is a pure black image (a pure black full screen picture). It should be noted that the present disclosure provides no limitation to the type of main image. For example, in an embodiment, the main image (i.e., the first image, the second image, and the third image) may be picture of other colors (e.g., a pure gray picture, a single primary color picture showing one of the three primary colors). In another example, in another embodiment, the boundary of the main image (i.e., the first image, the second image, and the third image) has a pure color frame such as a white frame (the color of the frame is different from the color of the image in the frame), such that the user can clearly identify the boundary of the projected multiple images and the overlapping area.

The image of the first portion of the first image IMG01 and the image of the first portion of the second image IMG02 projected on the projection surface SC1 overlap the overlapping image OIMG1 in the overlapping area (light-colored area at the boundary between the first image and the second image as shown in FIG. 2A) on the projection surface SC1, and the black-level brightness of the overlapping image OIMG1 in the overlapping area is higher than that of the first image IMG01 and the second image IMG02 of other parts. In addition, the image of the first portion of the third image IMG03 and the image of the second portion of the second image IMG02 projected on the projection surface SC1 overlap the overlapping image OIMG2 in the overlapping area (the light-colored area at the boundary between the third image and the second image as shown in FIG. 2A) on the projection surface SC1, and the black-level brightness of the overlapping image OIMG2 in the overlapping area is higher than that of the third and second images of other portions. It should be indicated that the projection surface SC1 may be a flat surface (e.g., curtain, wall) of any forms, and the preferred one is a custom-made white projection screen.

Figure 4A:
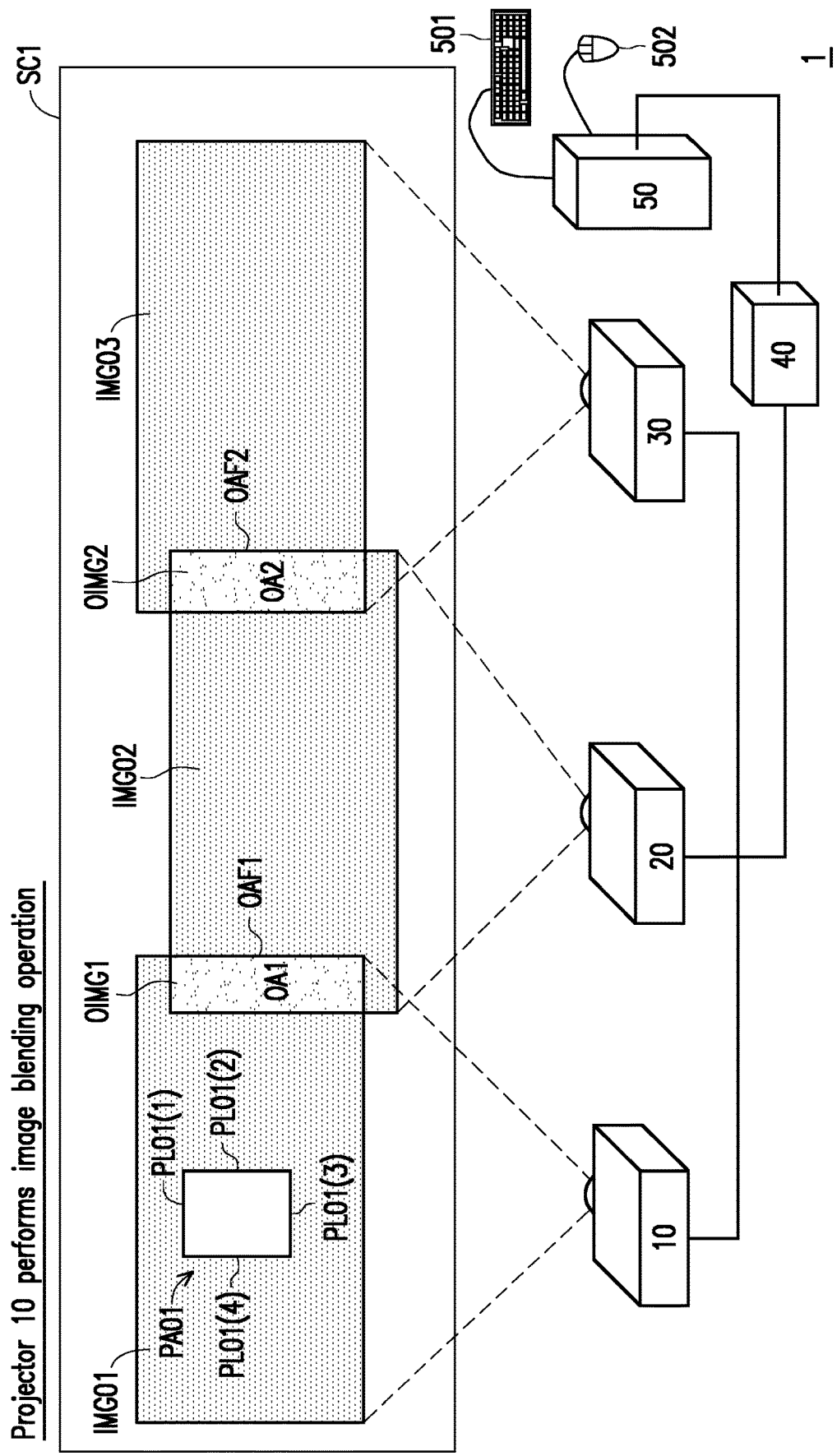
FIG. 4A and FIG. 4B are schematic diagrams illustrating image blending operations performed by a first projector according to an embodiment of the disclosure.
Figure 4B:
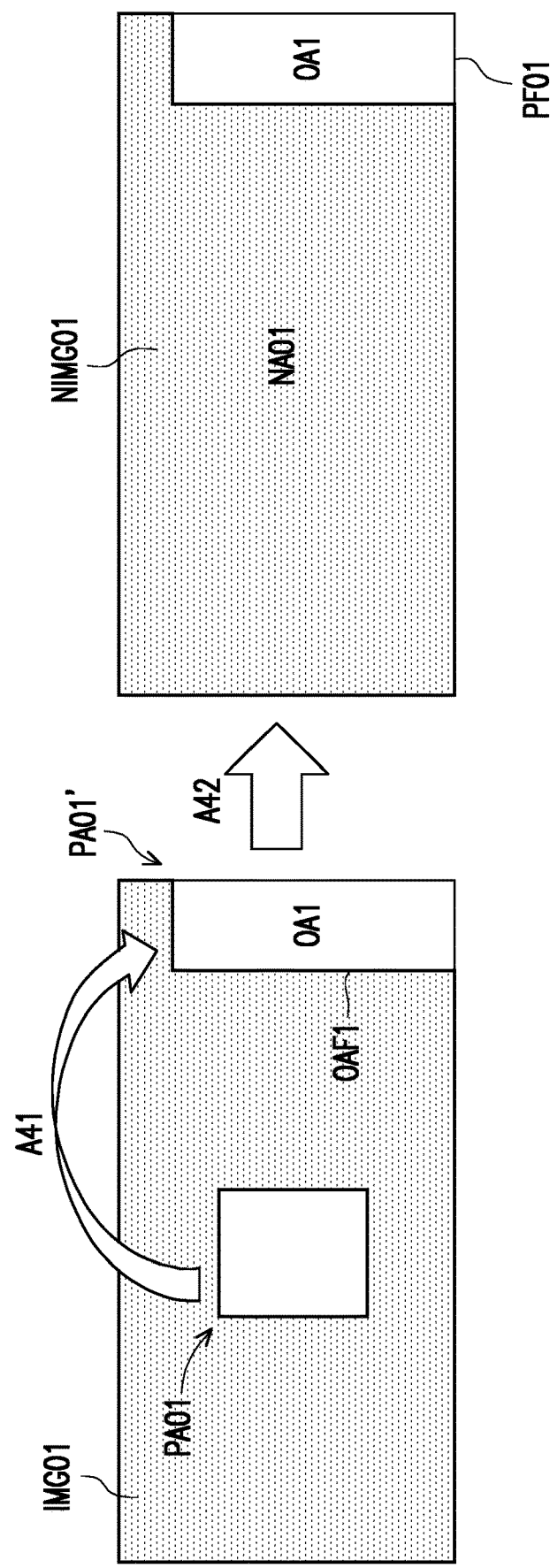
Figure 5A:
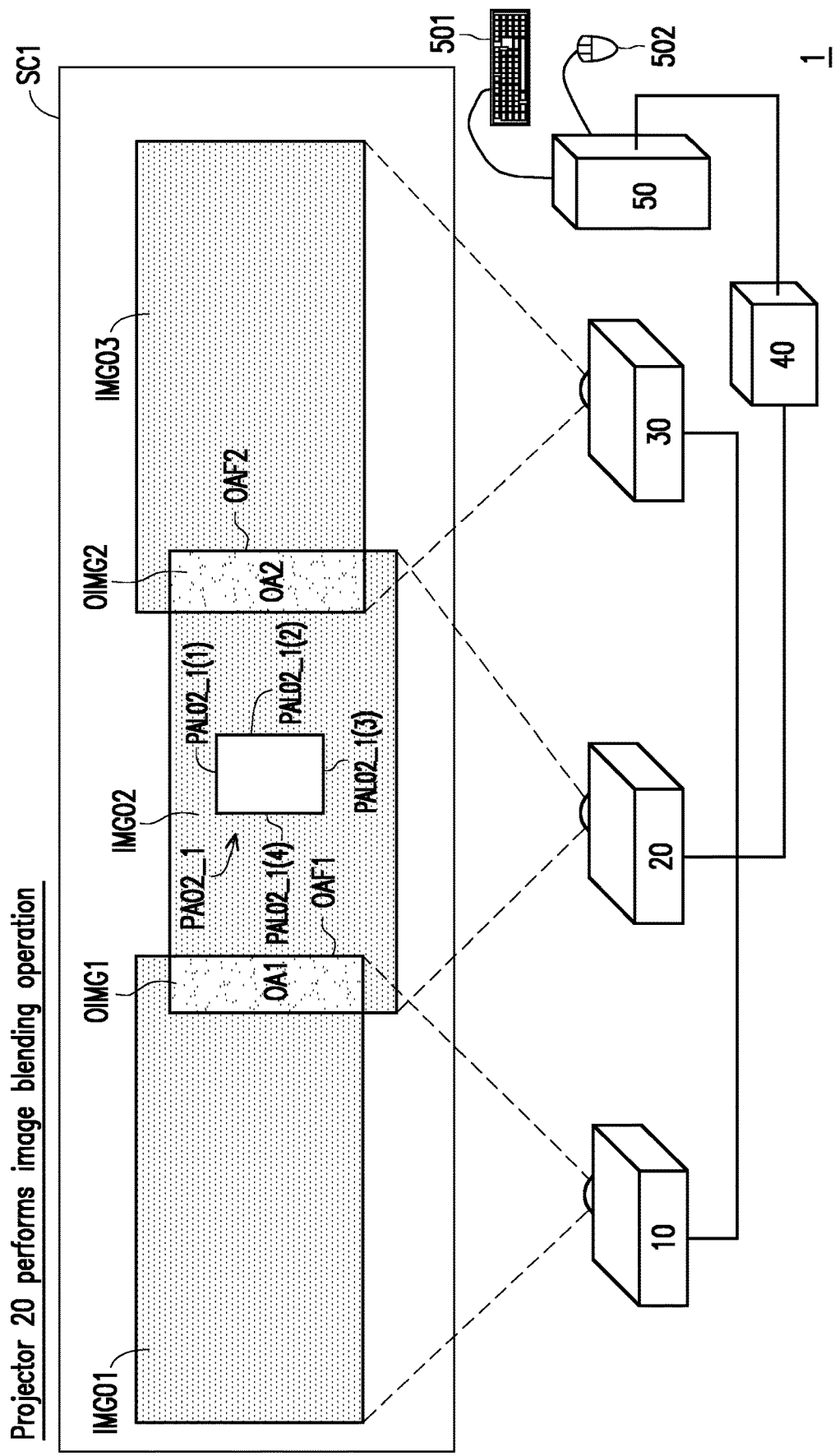
FIG. 5A, FIG. 5B, and FIG. 5C are schematic diagrams illustrating image blending operations performed by a second projector according to an embodiment of the disclosure.
Figure 5B:
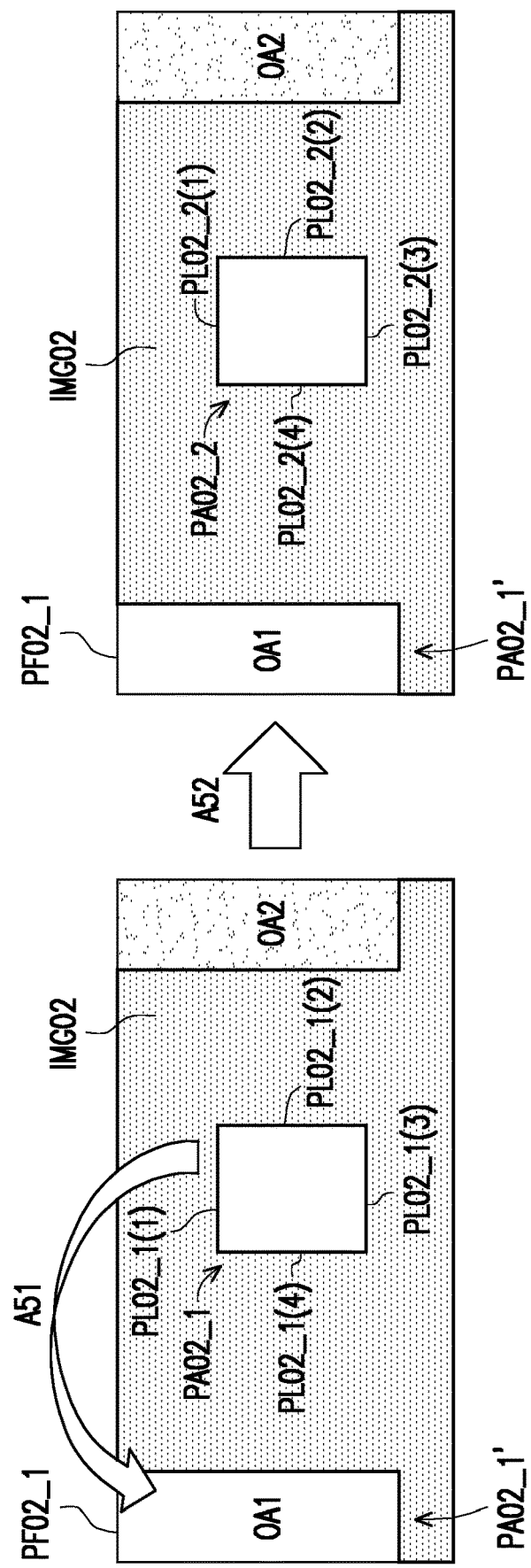
Figure 5C:
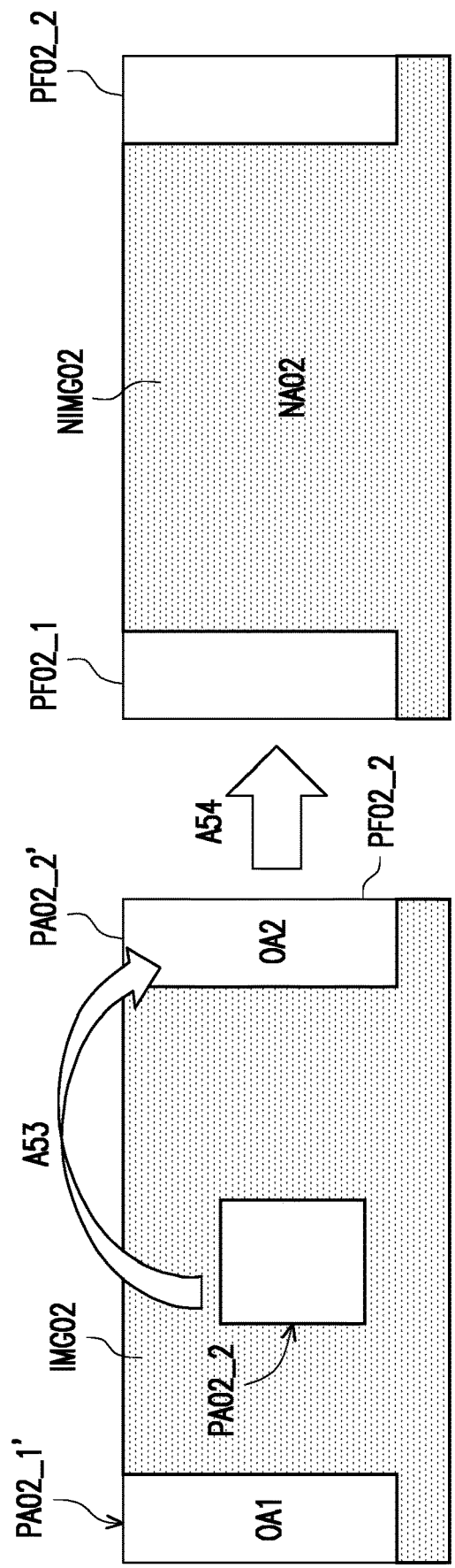
Figure 6A:
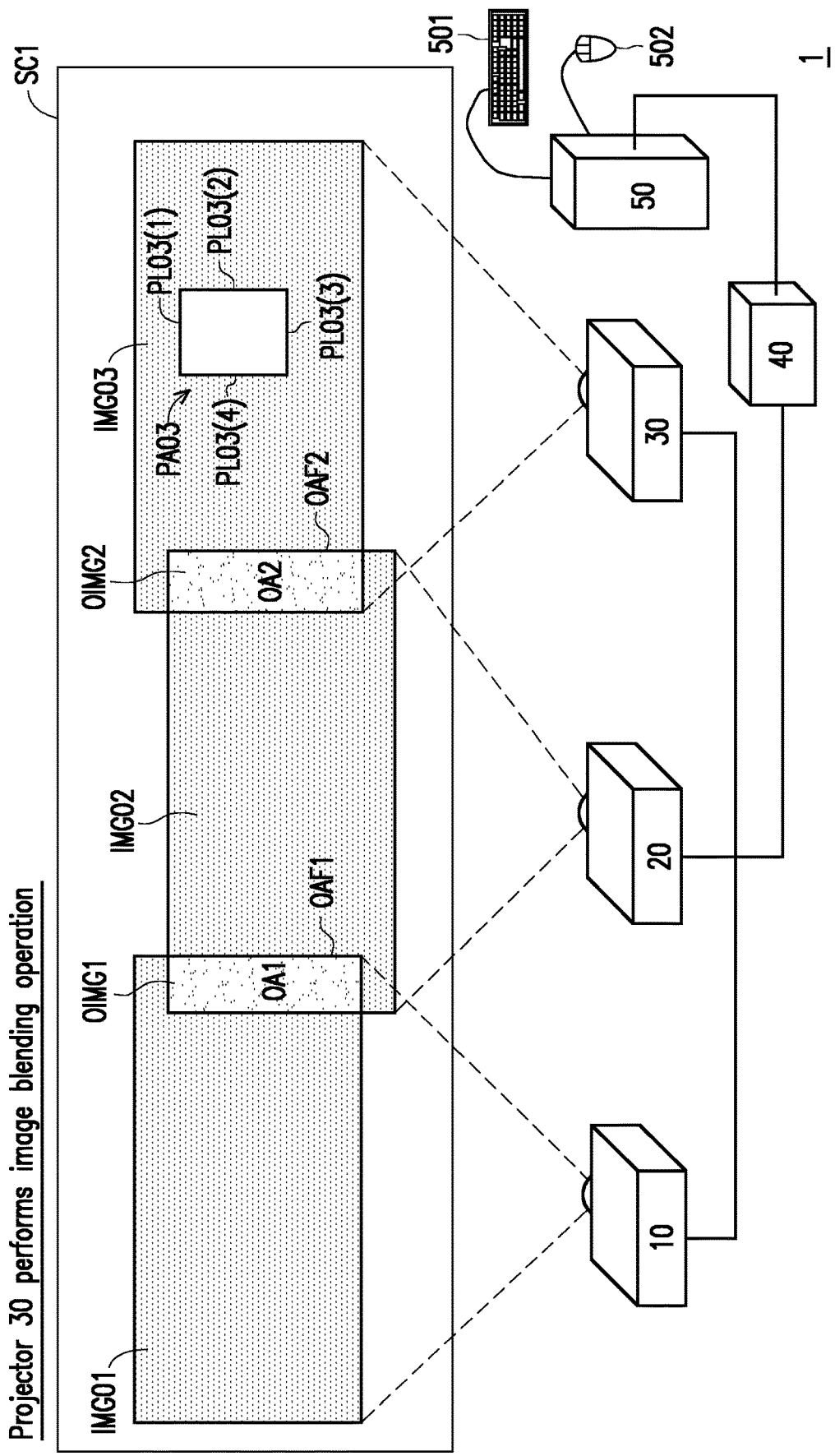
FIG. 6A and FIG. 6B are schematic diagrams illustrating an image blending operation performed by a third projector according to an embodiment of the disclosure.
Figure 6B:
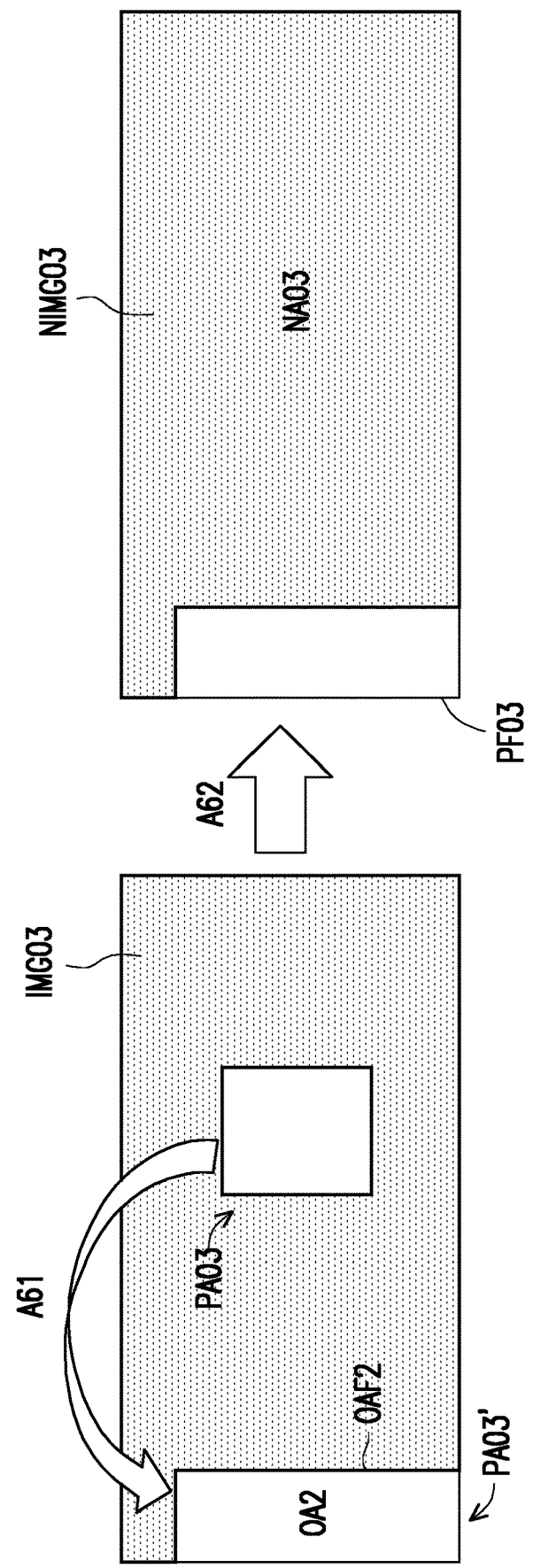

After the first image IMG01, the second image IMG02, and the third image IMG03 are all projected onto the projection surface SC1, the user may choose to perform a setting operation of the control pattern and a corresponding image blending operation (or blackening program) through the first projector 10 (as shown in FIG. 4A, FIG. 4B), the second projector 20 (as shown in FIG. 5A, FIG. 5B, and FIG. 5C), or the third projector 30 (as shown in FIG. 6A and FIG. 6B) first.

For ease of explanation, it is assumed that the user first selects the first projector 10 to perform a setting operation of the control pattern.

FIG. 4A and FIG. 4B are schematic diagrams illustrating image blending operations performed by a first projector according to an embodiment of the disclosure. Referring to FIG. 4A, in response to receiving an input operation for indicating execution of the setting of the control pattern (e.g., receiving an input signal of the input operation, which indicates that the setting of the control pattern is initiated), the main processor 500 renders the first control pattern PA01 (e.g., through the control pattern setting module 5312), and makes the first projector to project the first control pattern PA01 to the first image IMG01 through an image cropping device 40. In this embodiment, the first control pattern PA01 is, for example, a first two-dimensional block of which the contour is a polygon (for example, a rectangular block illustrated in FIG. 5A, which has four first boundaries PL01(1)~PL01(4) that may be adjusted), wherein the shape and range of the first two-dimensional block are adjustable, and the first two-dimensional block may be dragged. Specifically, in this embodiment, in order to allow the user to clearly identify the area covered by the control pattern, the control pattern is preset to be a transparent area or may be set as a pure color block. The boundaries PL01(1)~PL01(4) (i.e., all boundaries of the first control pattern) forms the first control pattern frame PF01. The so-called "Render" refers to a program operation through which an image of the control pattern that is created through a program may be superimposed on the original image. The first control pattern PA01 is stored, for example, in the control pattern setting module 5312.

After rendering the first control pattern PA01 to the first image IMG01, the main processor 500 adjusts the position, shape, and size of the first control pattern PA01 in the image IMG01 (through executing control pattern setting module 5312) according to the first input operation (e.g., an input operation performed by controlling an input device such as a mouse/keyboard) performed by the user. For example, the user may perform adjustment of the first control pattern PA01 through an input device (e.g., a mouse) connected to the input interface 550. For example, the user may use the mouse cursor to click the middle portion (non-boundary portion) of the first control pattern PA01 to drag the first control pattern PA01 to any position of the first image IMG01. The user may use the cursor to extend/contract the selected boundary outward/inward at the four adjustable first boundary PL01(1)~PL01(4) to change the shape of the first control pattern. The user may control the slope of any boundary (e.g., by rotating the selected boundary). The user may adjust the position of the vertex (the intersection point between each boundary) of each of the first control patterns. The user may divide the first boundary into two first boundaries by adding a vertex to a boundary, thereby changing the shape of the first control pattern (for example, from a quadrilateral to a pentagon). It should be indicated that the above is only part of the implementation of "adjusting the first control pattern" and is not intended to limit the present disclosure. The first control pattern may also be changed in shape, size and position through other kinds of input operations.

In addition, it should be noted that the control pattern of the present disclosure is not limited to blocks. For example, in another embodiment, the first control pattern includes a plurality of first dots and a plurality of first straight lines PL01(1)~PL01(4) connecting the plurality of first dots. Specifically, the plurality of first straight lines form a first polygon, and the plurality of first points are a plurality of vertices of the first polygon. It should be noted that in other embodiment, the elements of the first control pattern (i.e., the plurality of first dots and the plurality of first straight lines) may each be selected to perform a moving operation. In addition, the main processor 500 may select all the first dots at a time or select all the first straight lines at a time to move.

In this embodiment, the main processor 500 may (through executing the control pattern setting module 5312) continuously identify and record the position (coordinate) of all the pixels corresponding to the first control pattern PA01 in the first image. In addition, the first control pattern PA01 is preset to be rendered to the first initial position in the first image IMG01. The first initial position may be preset as any position of the first image IMG01 (e.g., the center of the first image IMG01). The user may use an input operation to set a first initial position of the first control pattern PA01 for each image blending operation. For example, the user may directly use the mouse cursor position to set the middle or right half of the first image IMG01 appearing in proximity of the overlapping area OA1 when the first control pattern PA01 is rendered to the first image IMG01 for the first time.

Referring to FIG. 4B, the user may adjust the first control pattern PA01 such that the first control pattern frame PF01 of the adjusted first control pattern PA01' matches the boundary OAF1 of the overlapping area OA1. That is, the main processor 500 may adjust the first control pattern PA01 to become the adjusted first control pattern PA01' (e.g., as indicated by arrow A41) according to a series of first input operations.

Then, after the adjustment of the first control pattern PA01 is completed (the user may also use a specific input operation to instruct the main processor 500 that the matching of the first control pattern has been completed, and start to identify the non-overlapping area of the first image IMG01), the main processor 500 may determine (through executing the control pattern setting module 5312) the area covered by the first control pattern PA01' according to a plurality of coordinates of all pixels of the adjusted first control pattern PA01' (or the first control pattern frame PF01) in the first image IMG01, that is, the area where the first image IMG01 overlaps with other images (i.e., the overlapping area OA1). Moreover, the main processor 500 may identify (through executing control pattern setting module 5312) that other areas in the first image IMG01 excluding the adjusted first control pattern PA01' (or the first control pattern frame PF01) is a non-overlapping area NA01 (also referred to as a first non-overlapping area) (as indicated by an arrow A42). In addition, a portion of the first image IMG01 in the first non-overlapping area NA01 is identified as the first non-overlapping image NIMG01.

It should be noted that, since the first image IMG01 has only one overlapping area, the user only sets a first control pattern to match an overlapping area. However, the disclosure is not limited thereto. For example, for an image having multiple overlapping areas, the same number of control patterns may be set based on the total number of the plurality of overlapping areas, so that each of the control patterns can be matched to an overlapping area. In this way, the main processor 500 can completely identify the range and position of all overlapping areas in the image, thereby identifying the position and range of the non-overlapping area of the image.

For example, the user selects the second image IMG02 projected by the second projector 20 to perform the blackening program. It should be noted that the second image IMG02 has an area OA1 (first overlapping area) and an area OA2 (second overlapping area) respectively overlapping the first image IMG01 and the third image IMG03.

FIG. 5A, FIG. 5B, and FIG. 5C are schematic diagrams illustrating image blending operations performed by a second projector according to an embodiment of the disclosure. Referring to FIG. 5A, likewise, in response to receiving an input operation for indicating the setting of the control pattern is performed on the second image IMG02, the main processor 500 first renders a second control pattern PA02_1 to the second image IMG02, and makes the second projector project the second control pattern PA02_1 to the second image IMG02 through the image cropping device 40. The second control pattern PA02_1 is, for example, a two-dimensional block having a plurality of second boundaries PL02_1(1) to PL02_1(4).

Referring to FIG. 5B, after rendering the second control pattern PA02_1 to the second image IMG02, the main processor 500 adjusts the position, shape and size of the second control pattern PA02_1 in the second image IMG02 according to the second input operation performed by the user, such that the second control pattern frame PF02_1 of the adjusted second control pattern PA02_1' matches the boundary of the overlapping area OA1. That is, the main processor 500 may adjust the second control pattern PA02_1 to become the adjusted second control pattern PA02_1' (as indicated by arrow A51) according to a series of second input operations.

Then, after the adjustment of the second control pattern PA02_1 is completed, since another overlapping area OA2 is not yet matched, the user may continue to set another second control pattern PA02_2 to match the second image IMG02. That is, the main processor 500 may render another second control pattern PA02_2 to the second image IMG02 (e.g., as indicated by arrow A52) according to the second input operation received again before the input operation corresponding to completion of setting of all the control patterns is received. The second control pattern PA02_2 is, for example, a two-dimensional block having a plurality of second boundaries PL02_2(1) to PL02_2(4).

Next, referring to FIG. 5C, after rendering the second control pattern PA02_2 to the second image IMG02, the main processor 500 adjusts the position, shape, and size of the second control pattern PA02_2 in the second image IMG02 according to the second input operation performed by the user, such that the second control pattern frame PF02_2 of the adjusted second control pattern PA02_2' matches the boundary of the overlapping area OA2. That is, the main processor 500 may adjust the second control pattern PA02_2 to become the adjusted second control pattern PA02_2' (as indicated by arrow A53) according to a series of second input operations.

Then, after the adjustment of the second control pattern PA02_2 is completed (the user may also use a specific input operation to instruct the main processor 500 that all the second control patterns of have been matched, and start to identify the non-overlapping area of the second image IMG02), the main processor 500 may (through executing control pattern setting module 5312) determine the area covered by the second control patterns PA02_1' and PA02_2' according to the plurality of coordinates of all the pixels of the adjusted second control pattern PA02_1' (or the second control pattern frame PF02_1) and the adjusted second control pattern PA02_2' (or the second control pattern frame PF02_2) in the second image IMG02, that is, the area where the second image IMG02 overlaps with other images (i.e., the overlapping areas OA1, OA2). Moreover, the main processor 500 may identify (through executing control pattern setting module 5312) that other areas in the second image IMG02 excluding the adjusted the second control pattern PA02_1' (or the second control pattern frame PF02_1) and the adjusted second control pattern PA02_2' (or the second control pattern frame PF02_2) are non-overlapping areas NA02 (also referred to as second non-overlapping areas) (e.g., as indicated by arrow A54). In addition, a portion of the second image IMG02 in the second non-overlapping area NA02 is identified as the second non-overlapping image NIMG02.

Next, the user selects the third image IMG03 projected by the third projector 30 to perform the blackening program.

FIG. 6A and FIG. 6B are schematic diagrams illustrating an image blending operation performed by a third projector according to an embodiment of the disclosure. Referring to FIG. 6A, in response to receiving an input operation for indicating execution of setting a control pattern, the main processor 500 is configured to render the third control pattern PA03 (e.g., through the control pattern setting module 5312), and makes the third projector 30 to project the third control pattern PA03 onto the third image IMG03 through the image cropping device 40.

Referring to FIG. 6B, after rendering the third control pattern PA03 to the third image IMG03, the main processor 500 adjust the third control pattern PA03 according to a third input operation performed by the user (e.g., through input operation performed by controlling an input device such as a mouse/keyboard), such that the third control pattern frame PF03 of the adjusted third control pattern PA03' matches the boundary OAF2 of the overlapping area OA2. That is, the main processor 500 may adjust the third control pattern PA03 to become the adjusted first control pattern PA03' (as indicated by arrow A61) according to a series of third input operations.

Then, after the adjustment of the third control pattern PA03 is completed (the user may also use a specific input operation to instruct the main processor 500 that the third control pattern has been matched, and start to identify the non-overlapping area of the third image IMG03), the main processor 500 may determine (through executing control pattern setting module 5312) the area covered by the third control pattern PA03' according to the plurality of coordinates of all pixels of the adjusted third control pattern PA03' (or the third control pattern frame PF03) in the third image IMG03 that is, an area (i.e., the overlapping area OA2) where the third image overlaps with other images, and the main processor 500 may identify (through executing control pattern setting module 5312) that other area in the third image IMG03 excluding the adjusted third control pattern PA03' (or the third control pattern frame PF03) is a non-overlapping area NA03 (also referred to as a third non-overlapping area) (as indicated by an arrow A62). In addition, a portion of the third image IMG03 in the third non-overlapping area NA03 is identified as the third non-overlapping image NIMG03.

On this occasion, the non-overlapping areas of all the images have been identified, and the user may further perform another input operation to instruct the main processor 500 to adjust the image parameters of the pixels of all non-overlapping areas.

Figure 7:
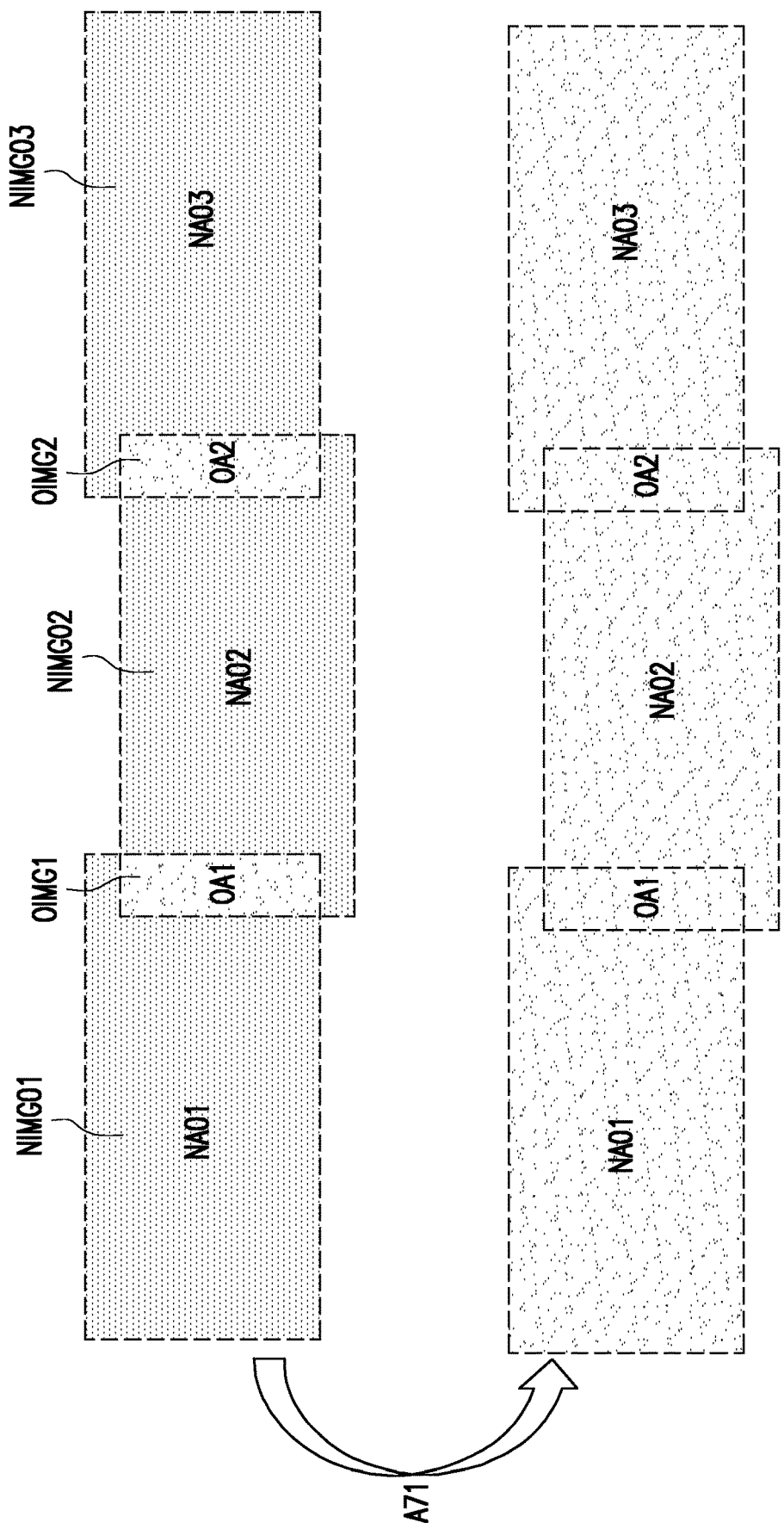
FIG. 7 is a schematic diagram illustrating an image blending operation performed by a projection system according to an embodiment of the disclosure.

FIG. 7 is a schematic diagram illustrating an image blending operation performed by a projection system according to an embodiment of the disclosure. Image parameters include grayscale values or three primary color light (RGB) values. In another embodiment, the image parameter may also include a brightness value or a grayscale value, etc.

Referring to FIG. 7, the main processor 500 may adjust the image parameters of all the pixels of the first non-overlapping area NA01, the second non-overlapping area NA02, and the third non-overlapping area NA03 according to the positions (coordinates) of the first non-overlapping area NA01, the second non-overlapping area NA02 and the third non-overlapping area NA03, such that the black-level brightness of the first non-overlapping image NIMG01 in the first non-overlapping area NA01 of the first image IMG01, the black-level brightness of the second non-overlapping image NIMG02 in the second non-overlapping area NA02 of the second image IMG02 and the black-level brightness of the third non-overlapping image NIMG03 in the third non-overlapping area NA03 of the third image IMG03 correspond to (similar to) the black-level brightness of the overlapping images OIMG1, OIMG2 in the overlapping areas OA1 and OA2. The so-called black-level brightness refers to the brightness of the blended image picture viewed by the user when the black picture is projected. That is, the brightness of the first non-overlapping image NIMG01, the second non-overlapping image NIMG02, the third non-overlapping image NIMG03 and the overlapping images OIMG1 and OIMG2 exhibit a substantially uniform brightness value (grayscale value) in the user's visual perception. In addition, the first control pattern and the second control pattern may have more dots and a plurality of straight lines connecting the plurality of dots. By means of the processing device 50, an option for selecting the number of dots of the control pattern, for example, the number of dots 2×2, 3×3 or 9×9, may be selected as the control pattern, but the projected control pattern only shows the dots on the frame, and the inner dots need not appear. When a plurality of number of dots are used, a more precise position (coordinate) of the overlapping area OA can be obtained.

More specifically, the above step may be further implemented as a mutual adjustment method. In an embodiment, in the mutual adjustment method, the main processor 500 may simultaneously adjust image parameters of non-overlapping areas of multiple images according to an input operation (e.g., clicking a button for increasing/decreasing image parameters) performed by the user. For example, the main processor 500 performs the following steps: the main processor 500 adjusts the image parameters corresponding to all the pixels in the first non-overlapping image NIMG01, the second non-overlapping image NIMG02 and the third non-overlapping image NIMG03 from the first value to the second value simultaneously according to the first input operation (clicking the button for increasing the image parameter) applied to the processing device 50, wherein the second value is greater than the first value, and the black-level brightness of the non-overlapping images NIMG01 to NIMG03 corresponding to the second value is greater than the black-level brightness of the non-overlapping images NIMG01-NIMG03 corresponding to the first value. For example, the first value and the second value are, for example, grayscale values, and the grayscale value of the pixel is from 0 to 255 levels. Therefore, when the user wants to make adjustment, the blackening management module 5313 of the processing device 50 may be used to adjust one level value at a time.

As indicated by the arrow A71, after the image parameters of all the pixels of the non-overlapping images NIMG01 to NIMG03 are adjusted, the black-level brightness of the non-overlapping images NIMG01 to NIMG03 is equal to the overlapping images OIMG1 and OIMG2 (the dark areas cannot be identified). As a result, the blackening program of the image blending operation is also completed.

In another embodiment, the present disclosure has another adjustment method, and the main processor 500 is capable of adjusting the image parameters of the non-overlapping area of the plurality of images according to an input operation (for example, clicking a button for increasing/decreasing the image parameter) performed by the user. For example, the main processor 500 performs the following steps: the main processor 500 adjusts the image parameters corresponding to all the pixels in the first non-overlapping image NIMG01 and the second non-overlapping image NIMG02 in the first image data from the first value to the second value according to the first input operation (clicking the button for increasing the image parameter) applied to the processing device 50, and the image parameters corresponding to all the pixels in the third non-overlapping image NIMG03 in the first image data are adjusted from the first value to the third value, wherein the second value is greater than the first value and the third value is greater than the first value. In an embodiment, the second value is close to the third value. The black-level brightness of the non-overlapping images NIMG01 to NIMG02 corresponding to the second value is greater than the black-level brightness of the non-overlapping images NIMG01 to NIMG02 corresponding to the first value. The black-level brightness of the non-overlapping image NIMG03 corresponding to the third value is greater than the black-level brightness of the non-overlapping image NIMG03 corresponding to the third value. The first non-overlapping image NIMG01, the second non-overlapping image NIMG02, and the third non-overlapping image NIMG03 may respectively have different first values or the same first value. It should be noted that the second value and the third value are both greater than the first value. For example, the first value, the second value and the third value are, for example, grayscale values, and the grayscale value of the pixel is from 0 to 255 levels. Therefore, when the user wants to make adjustment, the blackening management module 5313 of the processing device 50 may be used to adjust one level value at a time. As shown by the arrow A71, after the image parameters of all the pixels of the non-overlapping images NIMG01 to NIMG03 are adjusted, the black-level brightness of the non-overlapping images NIMG01 to NIMG03 is equal to the overlapping images OIMG1 and OIMG2 (the dark areas cannot be identified). As a result, the blackening program in the image blending operation is also completed.

Figure 8:
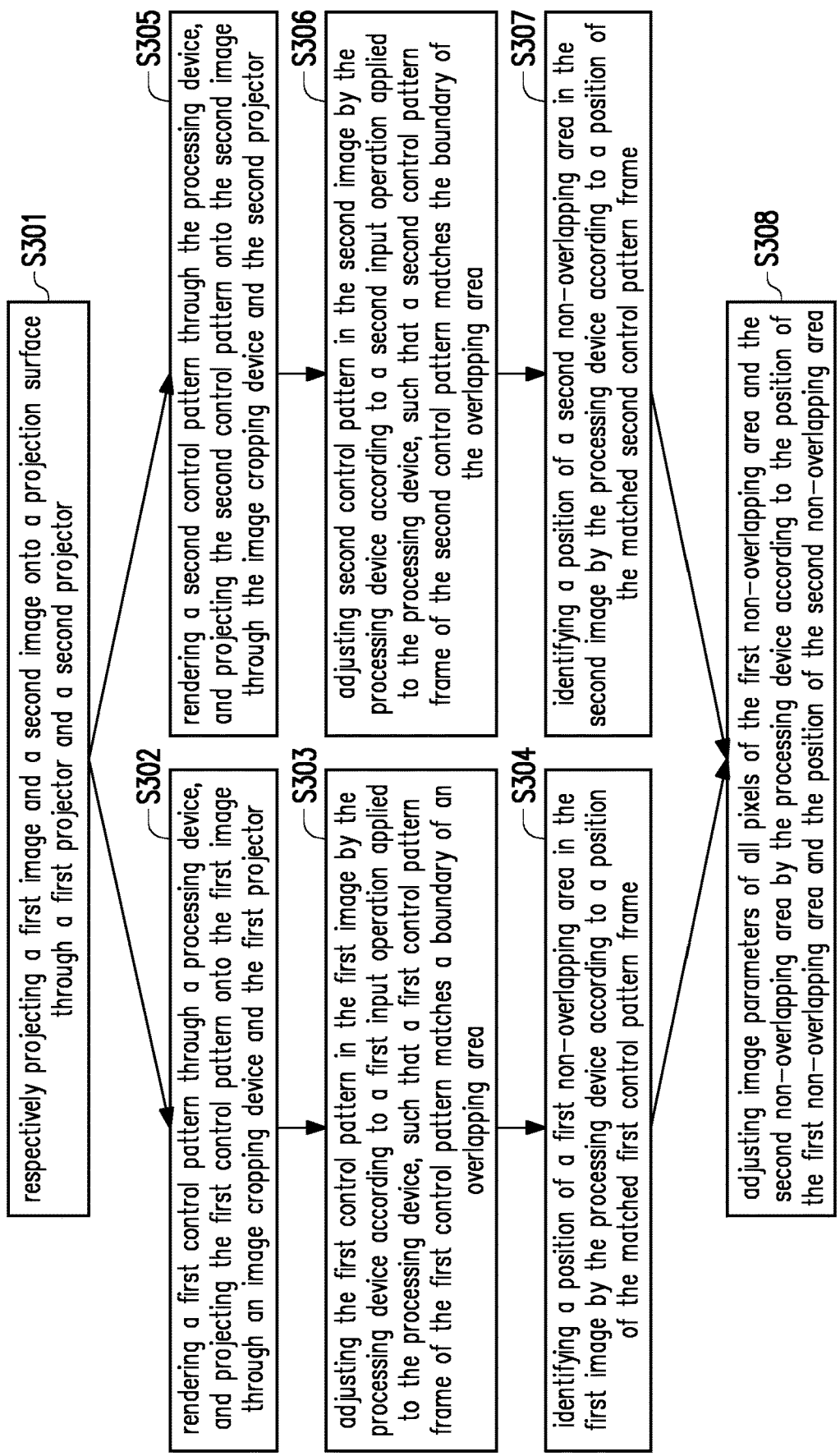
FIG. 8 is a flowchart of an image blending method according to an embodiment of the disclosure.

FIG. 8 is a flowchart of an image blending method according to an embodiment of the disclosure. Referring to FIG. 8, in step S301, the first image and the second image are respectively projected onto the projection surface through the first projector and the second projector, wherein the image of the first portion of the first image and the image of the second portion of the second image projected on the projection surface are overlapped in the overlapping area on the projection surface. In step S302, the first control pattern is rendered through the processing device, and the first control pattern is projected onto the first image through the image cropping device and the first projector. In step S303, the first control pattern in the first image is adjusted by the processing device according to the first input operation applied to the processing device, such that the first control pattern frame of the first control pattern matches the boundary of the overlapping area. In step S304, the position of the first non-overlapping area in the first image is identified by the processing device according to the position of the matched first control pattern frame, wherein the first non-overlapping area of the first image does not overlap the second image. In step S305, the second control pattern is rendered through the processing device, and the second control pattern is projected onto the second image through the image cropping device and the second projector. In step S306, the second control pattern in the second image is adjusted by the processing device according to the second input operation applied to the processing device, such that the second control pattern frame of the second control pattern matches the boundary of the overlapping area. In step S307, the position of the second non-overlapping area in the second image is identified by the processing device according to the position of the matched second control pattern frame, wherein the second non-overlapping area of the second image does not overlap the first image. In step S308, the image parameters of all the pixels of the first non-overlapping area and the second non-overlapping area are adjusted by the processing device according to the position of the first non-overlapping area and the position of the second non-overlapping area, such that the black-level brightness of the first non-overlapping image in the first non-overlapping area of the first image and the black-level brightness of the second non-overlapping image in the second non-overlapping area of the second image correspond to the black-level brightness of the overlapping image in the overlapping area.

It should be noted that the teaching, suggestions and implementations of the image blending method of the embodiment of the present disclosure can be derived sufficiently from the embodiments of FIG. 1 to FIG. 8, and thus related descriptions are omitted herein. In addition, it should be noted that the above steps are described based on a projection system having two or more projectors, but the present disclosure provides no limitation to the number of projectors in the projection system, and the projection system to which the image blending method of the present disclosure is applied may have two or more projectors (such as the projection system shown in FIG. 2).

In addition, in an embodiment, after the main processor 500 identifies the range and position of the overlapping area between each of the images, the main processor 500 may also record (for example, using the image segmentation management module 5311) the blending relationship of all the images. For example, the positions of all non-overlapping areas and overlapping areas are recorded at one time by using a larger coordinate system, such that the subsequent image segmentation operation or image blending operation may be performed based on the image overlapping relationship.

It should be noted that, in the foregoing embodiment, the image blending management module 531 including the image segmentation management module 5311, the control pattern setting module 5312 and the blackening management module 5313 is implemented in the form of software, but the present disclosure is not limited thereto. For example, in another embodiment, the image blending management module 531 may be implemented in the form of hardware, and become an image blending management circuit unit having the function of the image blending management module 531 and coupled to the main processor 500, wherein the image segmentation management module 5311 may be implemented as an image segmentation management circuit unit having the function of the image segmentation management module 5311. The control pattern setting module 5312 may be implemented as a control pattern setting circuit unit having the function of the control pattern setting module 5312, and blackening management module 5313 may be implemented as a blackening management circuit unit having the function of the blackening management module 5313.

In summary, the image blending method, the projection system and the processing device thereof provided by the embodiments of the present disclosure may project multiple control patterns, and adjust multiple control patterns through the processing device to be matched to the overlapping areas between multiple images projected by multiple projectors to identify a plurality of non-overlapping areas of the plurality of images, thus adjusting the image parameters of the images in the plurality of non-overlapping areas, such that the black-level brightness of all of the plurality of projected images are uniform. In this manner, not only that the multiple steps of the blackening program in the image blending operation can be simplified, but also the non-overlapping areas with irregular shapes can be efficiently identified, and the time consumed for the image blending operation for multiple projection images can be reduced, which in turn increases the overall operation efficiency of the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image blending method for a plurality of images projected by a plurality of projectors and a processing device, the plurality of projectors connected to the processing device, wherein the image blending method comprises:

projecting a first image and a second image onto a projection surface by a first projector and a second projector respectively, wherein an image of a first portion of the first image and an image of a first portion of the second image projected on the projection surface overlap each other in a first overlapping area on the projection surface;

rendering a first control pattern through the processing device, and projecting the first control pattern transmitted through the first projector onto the first image, wherein the first control pattern is projected onto a first initial position in the first image, and the first initial position of the first control pattern does not match the first overlapping area;

after projecting the first control pattern, adjusting the first control pattern in the first image and moving the first control pattern from the first initial position to the first overlapping area through the processing device according to a first input operation applied to the processing device such that a first control pattern frame of the first control pattern matches a boundary of the first overlapping area;

identifying, by the processing device, a position of a first non-overlapping area in the first image according to a position of the matched first control pattern frame;

rendering a second control pattern through the processing device, and projecting the second control pattern through the second projector onto the second image;

adjusting the second control pattern in the second image through the processing device according to a second input operation applied to the processing device such that a second control pattern frame of the second control pattern matches the boundary of the first overlapping area;

identifying, by the processing device, a position of the second non-overlapping area in the second image according to a position of the matched second control pattern frame; and adjusting, by the processing device, image parameters of all pixels of the first non-overlapping area and the second non-overlapping area according to a position of the first non-overlapping area and a position of the second non-overlapping area, such that a black-level brightness of a first non-overlapping image in the first non-overlapping area of the first image and a black-level brightness of a second non-overlapping image in the second non-overlapping area of the second image are close to a black-level brightness of a first overlapping image in the first overlapping area.

2. The image blending method according to claim 1, wherein the image parameters comprise grayscale values or three primary color light (RGB) values.

3. The image blending method according to claim 1, wherein the first control pattern comprises:
a first two-dimensional block, wherein a shape and a range of the first two-dimensional block are adjustable, and the first two-dimensional block can be dragged to the first overlapping area,
wherein the second control pattern comprises:
a second two-dimensional block, wherein a shape and a range of the second two-dimensional block are adjustable, and the second two-dimensional block can be dragged to the first overlapping area.

4. The image blending method according to claim 1, wherein the first image and the second image comprise:
a pure black picture;
a pure gray picture; or
a single primary color picture.

5. The image blending method according to claim 4, wherein a boundary between the first image and the second image further has a pure color frame.

6. A projection system, comprising a first projector, a second projector, and a processing device, wherein:
the processing device is connected to the first projector and the second projector, wherein the processing device is configured to, according to a projection instruction of the processing device, transmit an image data corresponding to the projection instruction to the first projector and the second projector,
wherein the first projector projects a first image onto a projection surface according to a first image data, and the second projector projects a second image onto the projection surface according to a second image data, wherein an image of a first portion of the first image and an image of a first portion of the second image projected on the projection surface overlap each other in a first overlapping area on the projection surface,
wherein the processing device renders a first control pattern, and projects the first control pattern onto the first image through the first projector, wherein the first control pattern is projected onto a first initial position in the first image, and the first initial position of the first control pattern does not match the first overlapping area,
wherein after projecting the first control pattern, the processing device is further configured to adjust the first control pattern in the first image and move the first control pattern from the first initial position to the first overlapping area according to a first input operation applied to the processing device, such that a first control pattern frame of the first control pattern matches a boundary of the first overlapping area,
wherein the processing device is further configured to identify a position of a first non-overlapping area in the first image according to a position of the matched first control pattern frame,
wherein the processing device renders a second control pattern, and projects the second control pattern onto the second image through the second projector,
wherein the processing device is further configured to adjust the second control pattern in the second image according to a second input operation applied to the processing device, such that a second control pattern frame of the second control pattern matches the boundary of the first overlapping area,
wherein the processing device is further configured to identify a position of a second non-overlapping area in the second image according to a position of the matched second control pattern frame,
wherein the processing device is further configured to adjust image parameters of all pixels of the first non-overlapping area and the second non-overlapping area according to a position of a first non-overlapping area and a position of a second non-overlapping area, such that a black-level brightness of a first non-overlapping image in the first non-overlapping area of the first image and a black-level brightness of a second non-overlapping image in the second non-overlapping area of the second image are close to a black-level brightness of a first overlapping image in the first overlapping area.

7. The projection system according to claim 6, wherein the first control pattern comprises:
a first two-dimensional block, wherein a shape and a range of the first two-dimensional block are adjustable, and the first two-dimensional block can be dragged to the first overlapping area,
wherein the second control pattern comprises:
a second two-dimensional block, wherein a shape and a range of the second two-dimensional block are adjustable, and the second two-dimensional block can be dragged to the first overlapping area.

8. The projection system according to claim 6, wherein the first image and the second image comprise:
a pure black picture;
a pure gray picture; or
a single primary color picture.

* * * * *